Patented June 17, 1924.

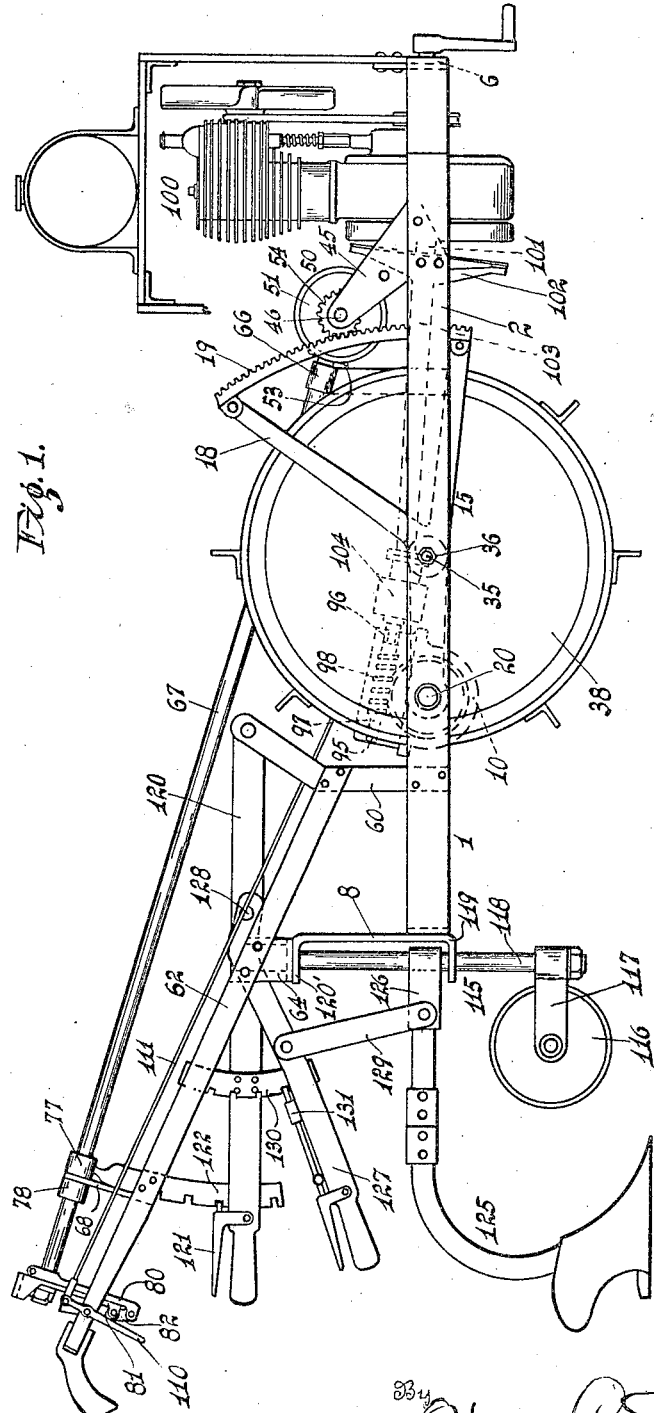

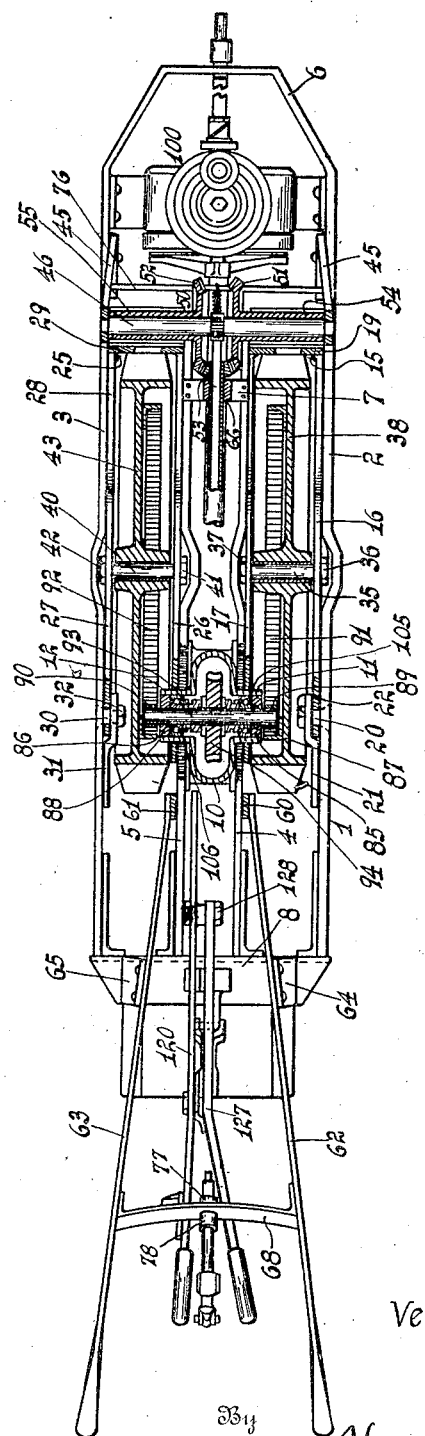

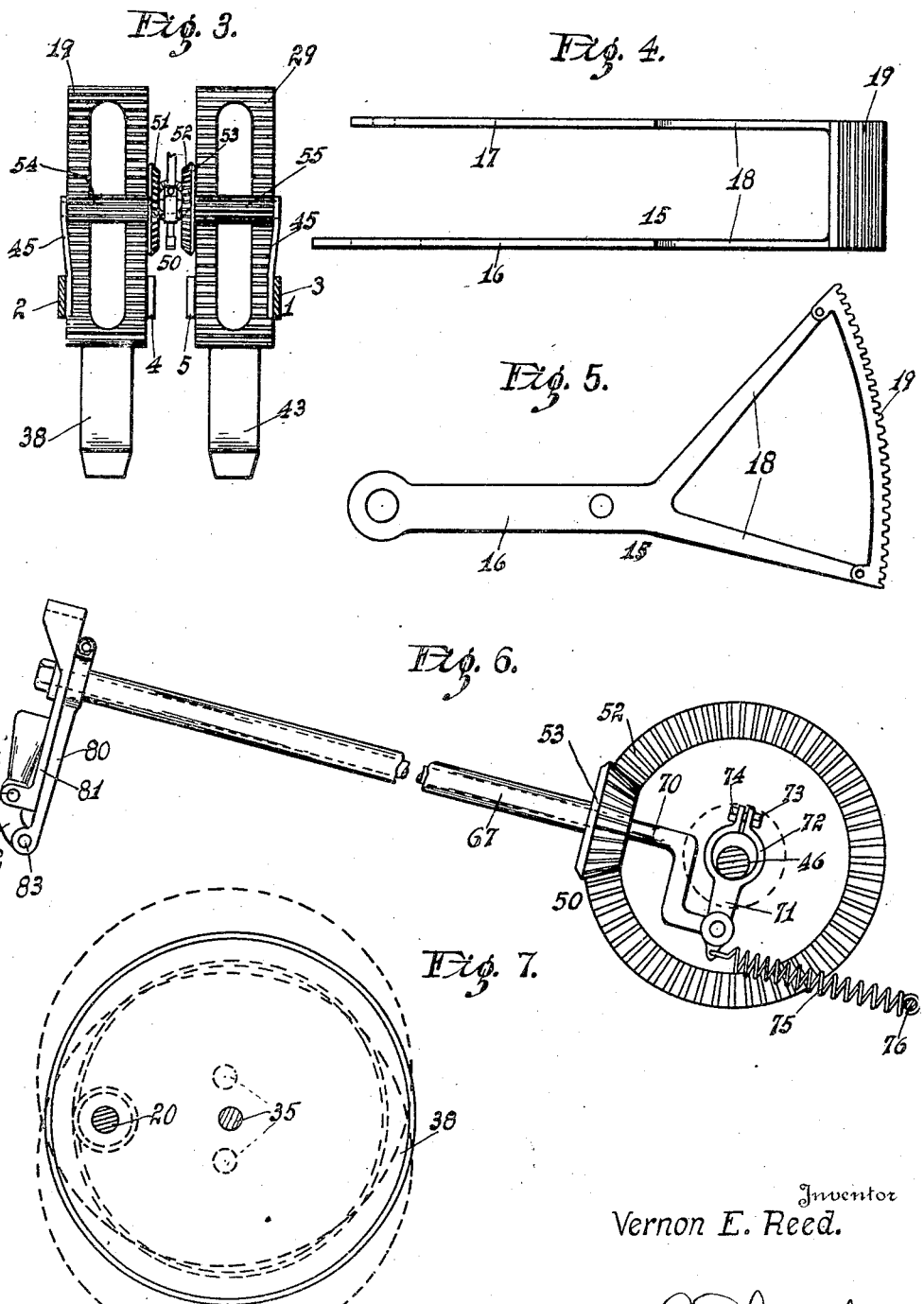

1,498,297

UNITED STATES PATENT OFFICE.

VERNON E. REED, OF OAKLAND, CALIFORNIA.

TRACTOR.

Application filed February 9, 1922. Serial No. 535,313.

*To all whom it may concern:*

Be it known that I, VERNON E. REED, a citizen of the United States, residing at Oakland, in the county of Alameda and State of California, have invented certain new and useful Improvements in Tractors, of which the following is a specification.

My invention is an improved hand tractor implement which contemplates means for adjusting the traction wheels at opposite sides of the implement up or down with relation to each other so that the wheels may be adapted to inclined or irregular surfaces of the ground to enable the implement to travel straight or in a vertical position. My implement may include an agricultural implement such as a plow or other agricultural implement and a trailer which implement and trailer wheel may be raised or lowered separately or together to adjust the same to the ground.

Referring to the annexed drawing in which my invention is illustrated and which forms a part of this specification:

Figure 1 is a side elevation of my implement.

Figure 2 is a plan view of my implement partly in section.

Figure 3 is a front elevation of the traction wheel raising and lowering mechanism.

Figure 4 is a plan view of one of the swinging frames and segmental gears of the tractor wheel raising and lowering mechanism.

Figure 5 is a side elevation of said swinging frame and segmental gear.

Figure 6 is a side view of the tractor wheel raising and lowering mechanism with one of the differential gears removed.

Figure 7 is a diagrammatic view illustrating the various positions of the tractor wheels.

In the drawings 1 indicates the implement frame which comprises horizontal side members 2 and 3, intermediate horizontal members 4 and 5, front end member 6 connecting the front ends of members 2 and 3, connecting member 7 connecting the front ends of members 4 and 5, and transverse vertical rear end member 8 to the lower part of which the rear ends of the horizontal members 2, 3, 4 and 5 are connected. A transmission gear casing 10 is mounted between the intermediate frame members 4 and 5, said casing being formed with tubular bearing supporting members 11 and 12 which project from opposite sides thereof through said frame members respectively.

A swinging tractor wheel supporting frame 15 includes a pair of arms 16 and 17 formed with forked forward ends 18 to which are secured a segmental gear 19. Said frame is pivotally mounted on the frame 1 at its rear end between the frame members 2 and 4 on a pivot bolt 20 and on the transmission tubular bearing member 11, said bolt extending through the member 2 and the rear end of arm 16, and said bearing member 11 extending through the rear end of arm 17. A plate 21 is secured to the inside of frame member 2 and is offset inwardly at its forward end over the inner end of the arm 16 and the bolt 20 extends through the offset end of said plate, on the inner end of which bolt screws a nut 22 against said offset end.

A swinging tractor wheel supporting frame 25 includes a pair of arms 26 and 27 formed with forked forward ends 28 similar to the forked ends 18 of frame 15, to which forked ends is secured a segmental gear 29. Said frame is pivotally mounted on the frame 1 between the frame members 3 and 5 on a pivot bolt 30 and on the transmission casing tubular bearing member 12, said bolt extending through the rear end of arm 27, and said tubular bearing member extending through the rear end of arm 26. A plate 31 is secured to the inside of frame member 3, said plate being offset at its forward end over the inner end of the arm 27, and the bolt 30 extending through said forward offset end, on the inner end of which bolt screws a nut 32 against said offset end of said plate. A shaft 35 extends across the frame 15 and through the arms 16 and 17 thereof, and nuts 36 and 37 screw on the ends of said shaft against said arms to detachably hold the shaft in position on said frame. A right tractor wheel 38 is journaled on the shaft 35 between the arms 16 and 17. The frame members 2 and 4 are offset to provide clearance for the nuts 36 and 37. A shaft 40 extends across the frame 25 and through the arms 26 and 27 thereof, and nuts 41 and 42 screw on the ends of said shaft against said arms to hold the shaft in position on said frame. The frame members 3 and 5 are offset to provide clearance for the nuts 41 and 42. A left tractor wheel 43 is journaled on the shaft 40 between the frame arms 26 and 27.

Brackets 45 are secured to the forward ends of the frame members 2 and 3 in the upper ends of which are journaled the ends of a transverse shaft 46. A reverse gearing 50 includes a pair of beveled gears 51 and 52 and a beveled pinion 53 in mesh with said beveled gears. On the hubs of the bevel gears 51 and 52 are formed pinions 54 and 55 respectively in mesh with the segmental gears 19 and 29 respectively. Upon rotation of the bevelled pinion 53, the bevelled gears 51 and 52 are rotated in opposite directions.

A pair of uprights 60 and 61 are secured to the frame members 4 and 5 rearwardly of the wheels 38 and 43, to the upper ends of which uprights are secured the forward ends of a pair of plow handles 62 and 63 which extend rearwardly of the frame 1 and upwardly at an incline and are secured intermediate their ends to brackets 64 and 65 respectively which brackets are secured to the top of the rear end frame member 8. A bracket 66 is secured to the frame front end connecting member 7, in which bracket is journaled the forward end of a sleeve 67, the rear end of which sleeve is journaled in a transverse connecting brace 68 which connects the plow handles 62 and 63 near the rear end thereof. A slidable shaft 70 extends through the sleeve 67 on the forward part of which forwardly of sleeve 67 is secured the beveled pinion 53 of the differential 50. The forward end of the shaft 70 is bent down and is connected to the lower end of an arm 71 which is formed with a split collar 72 surrounding the shaft 46. The split part of the collar 72 is bolted together by a bolt 73 and nut 74. A spring 75 is secured at its rear end to the lower end of the arm 71 and at its forward end to a transverse rod 76 which is connected at its ends to the side frame members 2 and 3, said spring normally holding the shaft 70 in its forward position and the bevel pinion 53 tightly in mesh with the bevel gears 51 and 52, whereby the reverse gearing is locked and the swinging frames 15 and 25 and tractor wheels 38 and 43 held in the positions to which they are adjusted. Collars 77 and 78 are secured on the sleeve 67 at opposite sides of the brace 68 to prevent longitudinal movement of the sleeve in its bearings. An arm 80 is secured on the rear end of the sleeve 67 and an arm 81 is secured on the rear end of the shaft 70, which arms are connected at their outer ends by a hand lever 82 which is pivoted to said arms by pivots 83 and 84 respectively. The arm 81 is normally held against the arm 80 by the spring 75 when the bevel pinion 53 is held tightly in mesh with the bevel gears 51 and 52. By means of the lever 82 the arm 81 and the shaft 70 may be moved rearwardly against the tension of spring 75 to loosen the mesh of the bevel pinion 53 and with the bevel gears 51 and 52 so that the operator by gripping the arms 80 and 81 may easily turn the reverse gearing 50 to raise one tractor wheel 38 or 43 and to lower the other with relation to each other to adapt said wheels to the incline or other configuration of the ground.

Bearings 85 and 86 are arranged in the tubular bearing members 11 and 12 of the transmission gear casing 10 in which bearings are journaled tubular shafts 87 and 88 respectively, concentric with the tubular bearings and fulcrum members 11 and 12 on the outer ends of which tubular shafts are secured pinions 89 and 90 respectively which mesh with internal gears 91 and 92 respectively, secured concentrically on the tractor wheels 38 and 43 respectively. A shaft 93 is journaled in the tubular shafts 87 and 88 and a worm gear 94 is secured on said shaft 93 between said tubular shafts within the gear casing 10. In bearings 95 and 96 is journaled a shaft 97 on which is secured a worm 98 in mesh with worm gear 94.

A gas engine 100 is mounted in the forward end of the frame 1, the drive shaft 101 of which is connected by a universal joint 102 to the forward end of a floating shaft 103, the other end of which shaft is connected by a universal joint 104 to the forward end of shaft 97, whereby the worm gear 94 is driven. Clutches 105 and 106 are mounted on the tubular shafts 87 and 88 for clutching said shafts to the worm gear 94 for driving the tractor wheels 38 and 43, through the medium of shaft 87, pinion 89 and gear 91, and through the medium of shaft 88, pinion 90 and gear 92, said tractor wheels being driven together or independently according as the clutches 105 and 106 are thrown into operation together or independently. The clutches 105 and 106 are operated by levers 110 pivoted on the rear part of plow handles 62 and 63, and a rod 111 connected to each lever.

The rear end of the frame 1 is mounted on a tiller 115 which comprises a tiller wheel 116 journaled in an arm 117 secured on the lower end of a vertical shaft 118 journaled and reciprocatively mounted in bearings 119 and 120' on the rear end frame connecting member 8. The upper end of shaft 118 is pivoted to a master lever 120 which is fulcrumed to an arm secured to the upright 61, on the rear end of which lever is pivoted a latch 121 which engages a notched segment secured to the brace 68 for securing the tiller at different elevations, with relation to the frame 1.

A plow 125 or other implement is slidably mounted on the shaft 118 by means of a strap 126 secured to the forward end of the plow shank. A plow lever 127 is pivoted at 128 to the master lever 120 and a link 129 connects said lever and the strap 126. A notched segment 130 is secured on the master lever 120 and a latch 131 is secured on the lever 127 for engaging said notched segment to hold the plow at different elevations with relation to the tiller 115. Both the tiller and the plow are raised and lowered together when the latch 131 engages the notched segment 130.

Having described my invention, I claim:

1. In a hand tractor implement, a main frame, a pair of swinging frames mounted on said main frame at opposite sides thereof, a tractor wheel journaled in each of said swinging frames, a segmental gear on each of said swinging frames, a reverse gearing mounted on said main frame, said reverse gearing including two gears and a pinion interposed between and meshing with said gears, a pinion secured to each gear meshing with said segmental gears respectively, means for turning said pinion to operate the reverse gearing to raise and lower said tractor wheels with relation to each other, means for shifting the first mentioned pinion so as to tighten the mesh of said pinion to lock the reverse gearing against turning and the tractor wheels in different relative positions, means for loosening the mesh of said bevelled pinion and bevelled gears whereby the tractor wheels may be adjusted to different relative positions and means for driving said tractor wheels.

2. In a reverse gearing including two bevel gears and a bevel pinion meshing with said bevel gears, means for tightening the mesh of said bevel pinion with said bevel gears to lock the reverse gearing against turning and means for loosening the mesh of said pinion and gears so that the gears may be rotated in opposite directions.

3. In a hand tractor implement, a main frame, a pair of swinging frames fulcrumed on said main frame, a tractor wheel journaled in each swinging frame, a segmental gear on each swinging frame, a pinion meshing with each segmental gear, a reverse gearing mounted on said main frame including two bevel gears and a bevel pinion meshing with said gears, each pinion meshing with said segmental gears being secured to one of the bevel gears, means for tightening the mesh of said bevel pinion with said bevel gears to lock the reverse gearing against turning and the tractor wheels in different relative positions, means for loosening the mesh of said bevel pinion and bevel gears to turn said gears to adjust the tractor wheels to different relative positions, and means for driving said tractor wheels.

4. In a hand tractor implement, a main frame, a pair of swinging frames fulcrumed on said main frame, a tractor wheel journaled in each swinging frame, a segmental gear on each swinging frame, a pinion meshing with each segmental gear, a reverse gearing mounted on said main frame including two bevel gears and a bevel pinion meshing with said bevel gears, each pinion meshing with said segmental gears being secured to one of the bevel gears, a sleeve journaled on said main frame, a shaft extending through said sleeve on the forward end of which said bevel pinion is secured, a spring connected to said shaft for normally maintaining said bevel pinion tightly in mesh with said bevel gears, means for moving said shaft against the tension of said spring to loosen the mesh of said bevel pinion with said bevel gears, and means for driving said tractor wheels.

5. In a hand tractor implement, a main frame, a pair of swinging frames fulcrumed on said main frame, a tractor wheel journaled in each swinging frame, a segmental gear on each swinging frame, a pinion meshing with each segmental gear, a reverse gearing mounted on said main frame including two bevel gears and a bevel pinion meshing with said bevel gears, each pinion meshing with said segmental gears being secured to one of the bevel gears, a sleeve journaled on said main frame, a shaft extending through said sleeve on the forward end of which said bevel pinion is secured, a spring connected to said shaft for normally maintaining said bevel pinion tightly in mesh with said bevel gears, an arm on the rear end of said sleeve, an arm on the rear end of said shaft, and a lever pivoted to said arms for moving said shaft rearwardly to loosen the mesh of said bevel pinion with said bevel gears, and means for driving said tractor wheels.

In testimony whereof I affix my signature.

VERNON E. REED.